US011019561B2

(12) United States Patent
Sasabe

(10) Patent No.: US 11,019,561 B2
(45) Date of Patent: May 25, 2021

(54) COMMUNICATION CONTROL DEVICE, COMMUNICATION CONTROL METHOD, WIRELESS COMMUNICATION APPARATUS AND COMMUNICATION CONTROL SYSTEM

(71) Applicant: NEC CORPORATION, Tokyo (JP)

(72) Inventor: Seiya Sasabe, Tokyo (JP)

(73) Assignee: NEC CORPORATION, Tokyo (JP)

(*) Notice: Subject to any disclaimer, the term of this patent is extended or adjusted under 35 U.S.C. 154(b) by 73 days.

(21) Appl. No.: 16/498,769

(22) PCT Filed: Mar. 16, 2018

(86) PCT No.: PCT/JP2018/010532
§ 371 (c)(1),
(2) Date: Sep. 27, 2019

(87) PCT Pub. No.: WO2018/180624
PCT Pub. Date: Oct. 4, 2018

(65) Prior Publication Data
US 2021/0112487 A1    Apr. 15, 2021

(30) Foreign Application Priority Data
Mar. 30, 2017   (JP) .............................. JP2017-066722

(51) Int. Cl.
*H04W 48/16*   (2009.01)
*H04W 48/20*   (2009.01)
*H04W 48/10*   (2009.01)
*H04W 76/11*   (2018.01)

(52) U.S. Cl.
CPC ........... *H04W 48/16* (2013.01); *H04W 48/10* (2013.01); *H04W 48/20* (2013.01); *H04W 76/11* (2018.02)

(58) Field of Classification Search
None
See application file for complete search history.

(56) References Cited

U.S. PATENT DOCUMENTS

2016/0337883 A1* 11/2016 Raleigh ................... H04L 67/16

FOREIGN PATENT DOCUMENTS

| JP | 2013-191909 A | 9/2013 |
| JP | 2014-528661 A | 10/2014 |
| JP | 2016103778 A | 6/2016 |

OTHER PUBLICATIONS

Communication dated Aug. 11, 2020 from the Japanese Patent Office in application No. 2019-509299.
(Continued)

*Primary Examiner* — Hong S Cho
(74) *Attorney, Agent, or Firm* — Sughrue Mion, PLLC

(57) ABSTRACT

A communication control device comprises a receiving means which receives mode information about a restriction mode which is a setting of the first base station device; and a policy generation means which generates the access policy on the basis of the mode information. When a second base station device, which is within a radio wave range in which communication is enabled with the first base station device, communicates with another wireless communication apparatus, the restriction mode is the setting in which the wireless communication apparatus performs an operation for lowering the priority of accessing the first base station device.

8 Claims, 6 Drawing Sheets

(56) References Cited

OTHER PUBLICATIONS

"3rd Generation Partnership Project; Technical Specification Group Services and System Aspects; Architecture enhancements for non-3GPP accesses (Release 14)", 3GPP TS 23.402 v141.0 (Sep. 2016), 306 pages.
Akiyoshi Inoki, "Hidden/exposed terminal estimation method using Beacon for Wireless LANs", IECE Technical Report, Mar. 2016, pp. 31-36, vol. 115, No. 496.
Written Opinion for PCT/JP2018101532, dated Jun. 5, 2018.
International Search Report for PCT/JP2018/010532, dated Jun. 5, 2018.

\* cited by examiner

COMMUNICATION CONTROL DEVICE, COMMUNICATION CONTROL METHOD, WIRELESS COMMUNICATION APPARATUS AND COMMUNICATION CONTROL SYSTEM

CROSS REFERENCE TO RELATED APPLICATIONS

This application is a National Stage of International Application No. PCT/JP2018/010532 filed Mar. 16, 2018, claiming priority based on Japanese Patent Application No. 2017-066722 filed Mar. 30, 2017, the disclosure of which is incorporated herein in its entirety by reference.

TECHNICAL FIELD

The present disclosure relates to a communication control device and a communication control method. The present disclosure relates particularly to a communication control device and a communication control method operable according to the Third Generation Partnership Project (3GPP) standards or their equivalents or derivatives but is not limited to these.

BACKGROUND ART

In recent years, as the communication traffic by the wireless communication apparatus increases, the wireless communication apparatus equipped with a plurality of communication interfaces have appeared. The purpose of equipping the wireless communication apparatus with a plurality of communication interfaces is, for example, to enable the selection of an appropriate radio access network (RAN) from among a plurality of RANs in response to the required communication quality and communication traffic or to achieve simultaneous connections to a plurality of RANs in order to reduce load on individual RANs.

For example, a wireless communication apparatus is adapted to the Universal Mobile Telecommunication System (UMTS), Wi-Fi (registered trademark), Worldwide Interoperability for Microwave Access (WiMAX, registered trademark), Bluetooth (registered trademark), and the like and is equipped with respective communication interfaces as Radio Access Technology (RAT).

For example, a connection mode in which connection is established principally to the UMTS but traffic offloading is performed to Wi-Fi is an effective means for reducing traffic load on the UMTS Terrestrial Radio Access Network (UTRAN), which is a RAN based on the UMTS. Note that examples of combinations of a RAN and a base station device for that RAN are, for example, a Wi-Fi network and a Wi-Fi access point, the UTRAN and NodeB, the Evolved Universal Terrestrial Radio Access Network (E-UTRAN) and Evolved NodeB (eNodeB), and the like.

With respect to the technology for traffic offloading, NPL 1 describes the Access Network Discovery and Selection Function (ANDSF). A device having an ANDSF is provided in a 3GPP network and transmits to a wireless communication apparatus a policy for selecting between the 3GPP network and a non-3GPP network (Wi-Fi network or the like). Wireless LAN selection policies (WLANSPs), which are policies stipulated in the ANDSF, have parameters for selection in the form of service set identifiers (SSIDs) and the like to indicate candidates. The selection of a base station device by a wireless communication apparatus depends on the policy determined by the communication common carrier for each user. Therefore, the coordination between the base station devices in the non-3GPP network and the device having the ANDSF is important.

CITATION LIST

Non Patent Literature

[NPL 1] 3GPP TS 23.402 v14.1.0 (2016-09), 3rd Generation Partnership Project; Technical Specification Group Services and System Aspects; Architecture enhancements for non-3GPP accesses (Release 14).

SUMMARY OF INVENTION

Technical Problem

NPL 1 mentioned above does not describe a policy with consideration for preventing the decline of efficiency in the use of communication resources of a plurality of base station devices in one and the same access network. Thus, when the wireless communication apparatus determine which base station to connect to in accordance with the policy generated by the ANDSF described in NPL 1, the efficiency in the use of communication resources of a plurality of base station devices in one and the same access network may decline. In view of the above-described problem, an objective of various aspects in the present disclosure is to provide a communication control device, a communication control method, a wireless communication apparatus, and a communication control system that handle a policy with consideration for preventing the decline of efficiency in the use of communication resources of a plurality of base station devices in one and the same access network.

Solution to Problem

A communication control device in the first aspect of the present disclosure includes an Access Network Discovery and Selection Function (ANDSF) for generating a connection policy for controlling connection of a wireless communication apparatus to a base station device, the communication control device comprising reception means for receiving mode information, which is information on a restricting mode, which is a setting of a first base station device; and policy generation means for generating the connection policy based on the mode information, wherein the restricting mode is a setting for performing an operation of decreasing a degree of priority given to a connection of the wireless communication apparatus to the first base station device when a second base station device located within a broadcast range that allows communication with the first base station device communicates with another wireless communication apparatus.

A communication control method in the second aspect of the present disclosure comprises receiving mode information, which is information on a restricting mode, which is a setting of a first base station device; and generating, based on the mode information, a connection policy for controlling connection of a wireless communication apparatus to a base station device, wherein the restricting mode is a setting for performing an operation of decreasing a degree of priority given to a connection of the wireless communication apparatus to the first base station device when a second base station device located within a broadcast range that allows communication with the first base station device is communicating with another wireless communication apparatus.

A wireless communication apparatus in the third aspect of the present disclosure comprises reception means for receiving a connection policy for controlling connection of the wireless communication apparatus to a base station device, the connection policy generated based on mode information, which is information on a restricting mode, which is a setting of a first base station device; and selection means for selecting, based on the connection policy, the first base station device as connection destination, wherein the restricting mode is a setting for performing an operation of decreasing a degree of priority given to a connection of the wireless communication apparatus to the first base station device when a second base station device located within a broadcast range that allows communication with the first base station device is communicating with another wireless communication apparatus.

A communication control system in the fourth aspect of the present disclosure comprises a communication control device including an Access Network Discovery and Selection Function (ANDSF) for generating a connection policy for controlling connection of a wireless communication apparatus to a base station device; a base station device; and a wireless communication apparatus, wherein the communication control device comprises reception means for receiving mode information, which is information on a restricting mode, which is a setting of a first base station device; and policy generation means for generating the connection policy based on the mode information, wherein the base station device comprises reception means for receiving the connection policy from the communication control device; and distribution means for distributing the connection policy to the wireless communication apparatus, wherein the wireless communication apparatus comprises reception means for receiving the connection policy from the base station device; and selection means for selecting, based on the connection policy, a base station device as connection destination, and wherein the restricting mode is a setting for performing an operation of decreasing a degree of priority given to a connection of the wireless communication apparatus to the first base station device when a second base station device located within a broadcast range that allows communication with the first base station device is communicating with another wireless communication apparatus.

Advantageous Effects of Invention

The various aspects in the present disclosure provide a communication control device, a communication control method, a wireless communication apparatus, and a communication control system that handle a policy with consideration for preventing the decline of efficiency in the use of communication resources of a plurality of base station devices in one and the same access network.

EXAMPLE EMBODIMENT

Figure 1:
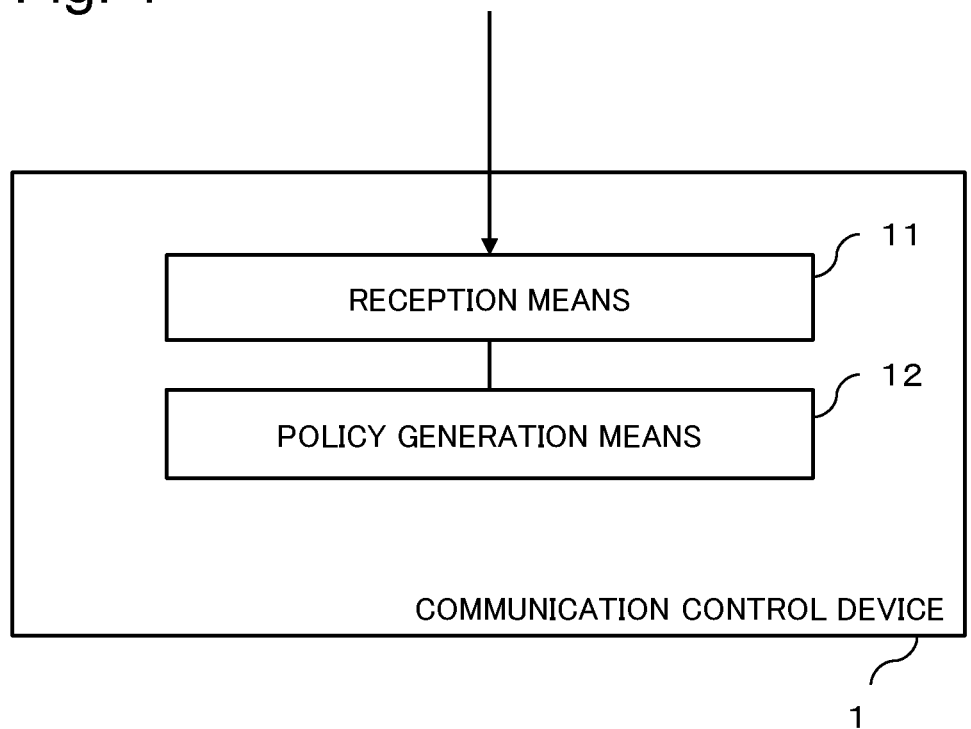
FIG. 1 is a diagram illustrating a configuration of a communication control device according to an aspect of the present disclosure.

The configurations of devices according to the present disclosure are illustrated in functional blocks. Each function may be achieved by any combination of hardware and software and there are various modifications for the method of such achievement and devices. The example embodiments described below are for illustrative purposes only and various configurations and combinations other than described below may be adopted. Further, the direction of arrows in the drawings indicates an example and is not intended to restrict the direction of signals between blocks.

FIG. 1 is a diagram illustrating a configuration of a communication control device according to an aspect of the present disclosure. The communication control device 1 illustrated in FIG. 1 includes a reception means 11 and a policy generation means 12. The communication control device 1 includes an Access Network Discovery and Selection Function (ANDSF), which generates a connection policy for controlling the connection of a wireless communication apparatus to a base station device.

The base station device is a device having functions of relaying and transferring data and, more specifically, may be a wireless LAN router such as a Wi-Fi access point, NodeB, eNodeB, or the like but is not limited to these. The wireless communication apparatus may be one of a piece of user equipment (UE) having a wireless connection function for a 3GPP network and a non-3GPP network and a station (STA) having a wireless connection function for a non-3GPP network but is not limited to these. More specifically, the wireless communication apparatus may be a mobile phone, a tablet terminal, a sensor, a personal computer (PC) serving as one of UE and STA but is not limited to these.

The reception means 11 receives information on the restricting mode, which is a setting of the base station device (hereinafter referred to as mode information). The mode information is a combination of a piece of information, such as SSID, that identifies the base station device and a mode identifier, which is a piece of information that indicates the designation of the restricting mode.

The restricting mode, which is a setting of the base station device, is a setting for performing an operation of decreasing the degree of priority given to a connection of a wireless communication apparatus to the base station device when another base station device located within a broadcast range that allows communication with the former base station device communicates with another wireless communication apparatus. The operation of decreasing the degree of priority given to a connection of a wireless communication apparatus to the base station device may be, for example, an operation of discarding the connection request, an operation of delaying the response to the connection request, an operation of rejecting the connection request, an operation of recommending connection to any other base station device, an operation of interrupting the processing for connecting to the base station device, or an operation of causing the wireless communication apparatus to interrupt the processing for connecting to the base station device.

A mode identifier is information for identifying the operation of decreasing the degree of priority given to a connection of a wireless communication apparatus to the base station device and, for example, a mode identifier may be "a binary value indicating whether to perform the operation of decreasing the degree of priority", "a value indicating the intensity with which to decrease the degree of priority", or "an identifier for identifying the operation of decreasing the degree of priority" but is not limited to these. The intensity with which to decrease the degree of priority may be, more specifically, a delay time in the response to the connection request or the like but is not limited to this.

The operation of delaying the response to the connection request may be, for example, delaying the response to the connection request by not less than the max channel time of the wireless communication apparatus but is not limited to this. The operation of rejecting the connection request may be, for example, a transmission of a message of rejection, a transmission of a response including information indicating rejection (for example, a reason for rejection), or the like but is not limited to these. The operation of recommending connection to any other base station device may be, for example, a transmission of information for recommending a connection to any other base station device (for example, the address or SSID of any other base station device or the like) but is not limited to this.

A connection request may be, for example, a probe request, an authentication request, an association request, or the like but is not limited to these. A response to a connection request may be, for example, a probe response, an authentication response, an association response, or the like but is not limited to these. For example, the base station device may set itself to the restricting mode upon receiving information indicating that there has been a response from another base station device, located within a broadcast range that allows communication with the former base station device, to a connection request by a wireless communication apparatus, at least from one of the latter base station device and the wireless communication apparatus that made the connection request. The information may be, for example, the response itself, an acknowledgement (ACK) of the response, or the like but is not limited to these.

When the base station device operates by the passive scanning method, the base station device may be set not to operate by the passive scanning method when the base station device is set to the restricting mode. This reduces the chance of a connection of a wireless communication apparatus to the base station device switched to the restricting mode.

Based on the mode information received by the reception means 11, the policy generation means 12 generates a connection policy for controlling the connection of a wireless communication apparatus to the base station device.

Figure 2:
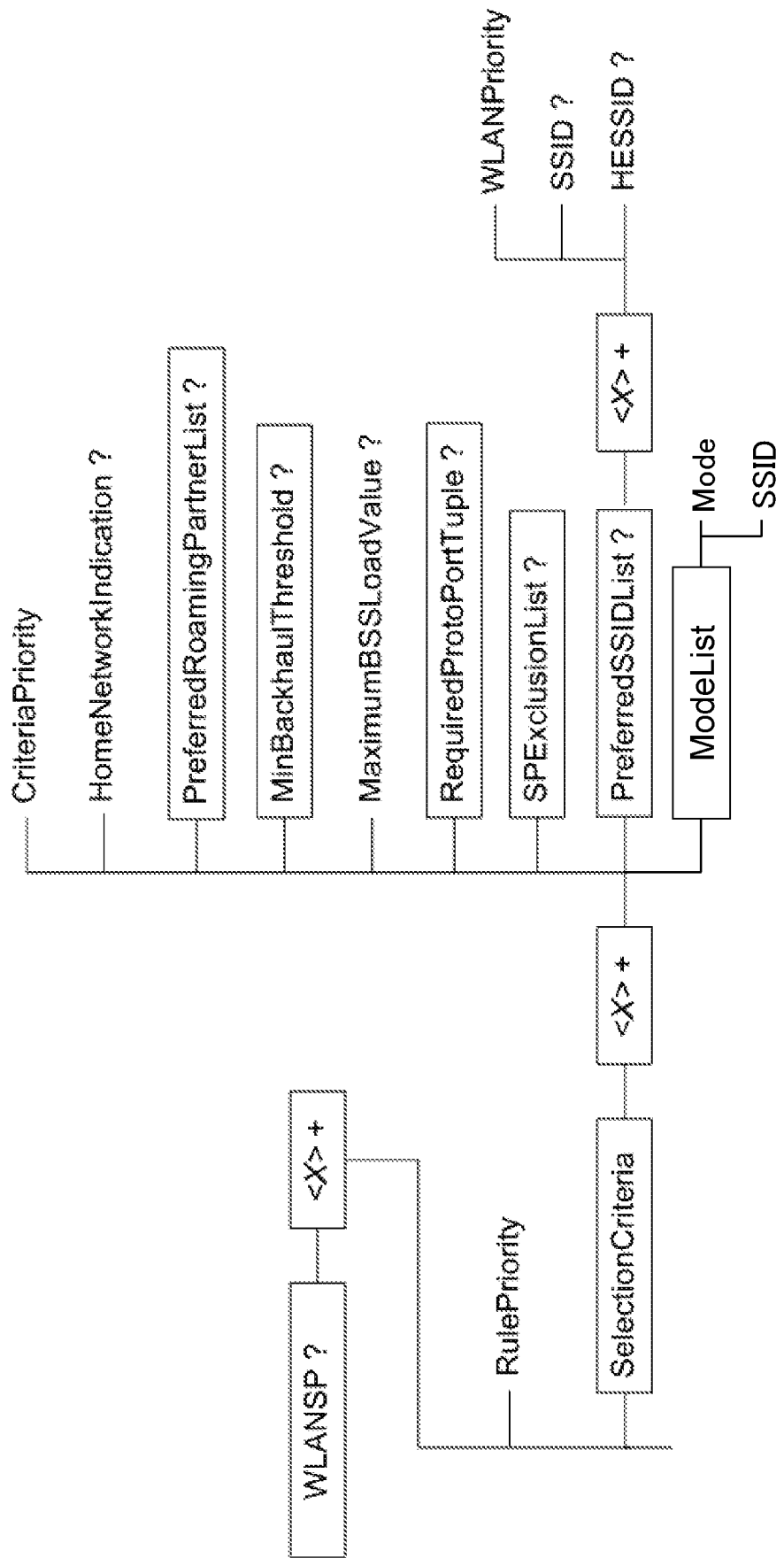
FIG. 2 is a diagram illustrating an example of a data structure of a WLANSP of an ANDSF Management Object (MO).

FIG. 2 is a diagram illustrating an example of a data structure of a WLANSP of an ANDSF Management Object (MO). For example, as illustrated in FIG. 2, an item on mode information (denoted in FIG. 2 as ModeList) may be added below the SelectionCriteria entry below the WLANSP entry. For example, as illustrated in FIG. 2, an item on SSID (denoted in FIG. 2 as SSID) and an item on mode identifier (denoted in FIG. 2 as Mode) may be added below the ModeList entry. Mode may take binary values, discrete values, or continuous values.

For example, based on the mode information received by the reception means 11, the policy generation means 12 may generate a connection policy in the ANDSF MO by setting information, such as SSID, that identifies the base station device to the item on SSID (denoted in FIG. 2 as SSID) below the ModeList entry in FIG. 2 and by setting a mode identifier to the item on mode identifier (denoted in FIG. 2 as Mode) below the ModeList entry in FIG. 2.

Alternatively, for example, based on the mode information received by the reception means 11, the policy generation means 12 may generate a connection policy by setting information, such as SSID, that identifies the base station device to an item below the SPExclusionList entry below the SelectionCriteria entry in FIG. 2.

Figure 3:
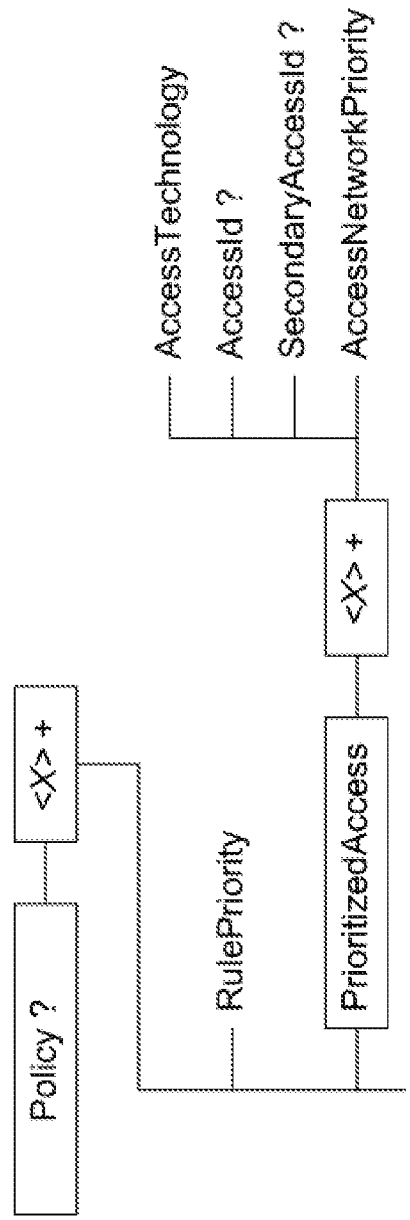
FIG. 3 is a diagram illustrating an example of a data structure of a policy of an ANDSF MO.

FIG. 3 is a diagram illustrating an example of a data structure of a policy of an ANDSF MO. For example, based on the mode information received by the reception means 11, the policy generation means 12 may generate a connection policy by setting information, such as SSID, that identifies the base station device to AccessId below PrioritizedAccess below the Policy entry in FIG. 3 and by setting a value regarding access restriction to AccessNetworkPriority. Here, for example, a value (254) indicating restricted access may be set to AccessNetworkPriority.

The policy generation means 12 may, for example, generate a connection policy based on not only the mode information but also user notification information generated by a Policy and Charging Rules Function (PCRF) or the like. In other words, the policy generation means 12 may, for example, generate a connection policy by setting such information to the ANDSF MO. Further, for example, MaximumESSLoadValue, which is an item related to the upper limit of the load on Extended Service Set (ESS), may be added below the SelectionCriteria entry in FIG. 2. The policy generation means 12 may, for example, generate a connection policy by setting an upper limit for the load on ESS to an item below the MaximumESSLoadValue entry. This allows the policy generation means 12 to generate a connection policy with consideration for not only the load on Basic Service Set (BSS) but also the load on ESS.

Figure 4:
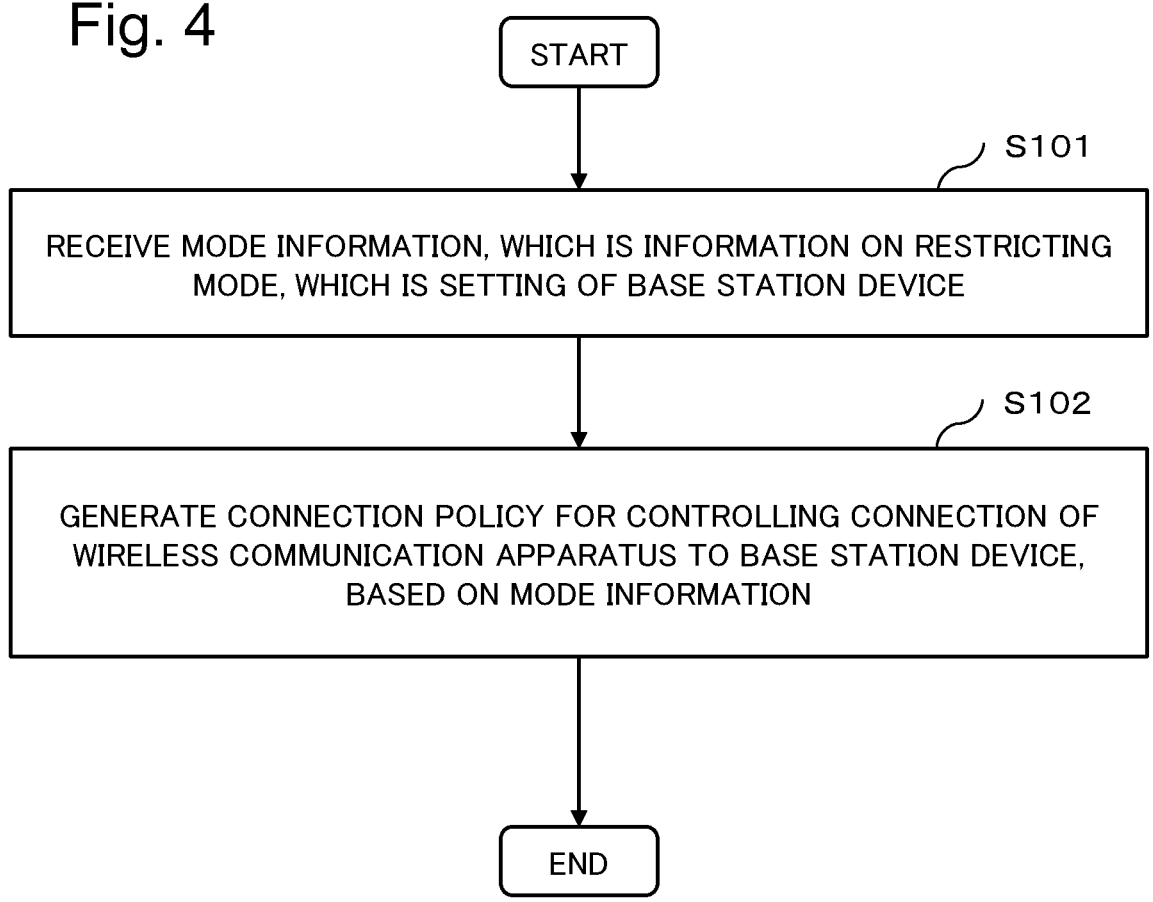
FIG. 4 is a diagram illustrating an operation of communication control according to an aspect of the present disclosure.

FIG. 4 is a flow chart illustrating an operation of communication control according to an aspect of the present disclosure. In FIG. 4, mode information, which is information on a restricting mode, which is a setting of a base station device, is received at Step S101. At S102, based on the mode information, a connection policy is generated for controlling the connection of a wireless communication apparatus to a base station device. This operation is accomplished, for example, in the communication control device 1. More specifically, Step S101 is accomplished, for example, in the reception means 11 and Step S102 is accomplished, for example, in the policy generation means 12.

Figure 5:
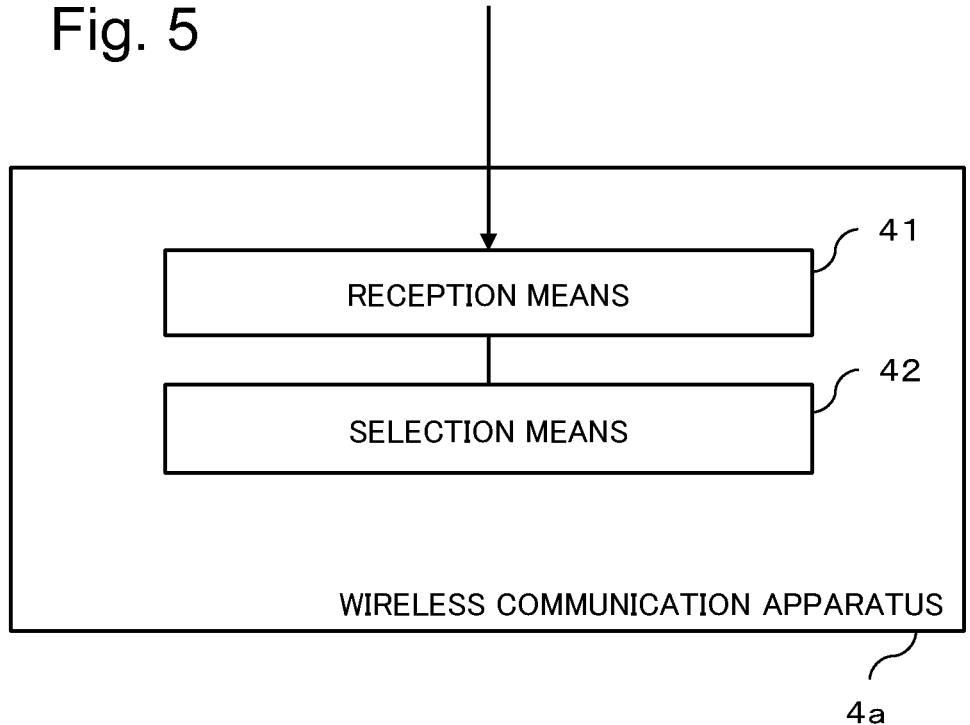
FIG. 5 is a diagram illustrating a configuration of a wireless communication apparatus according to an aspect of the present disclosure.

FIG. 5 is a diagram illustrating a configuration of a wireless communication apparatus according to an aspect of the present disclosure. The wireless communication apparatus 4a illustrated in FIG. 5 includes a reception means 41 and a selection means 42. The reception means 41 is a means for receiving a connection policy for controlling the connection of a wireless communication apparatus to a base station device, generated based on mode information. The selection means 42 is a means for selecting a base station device as connection destination, based on the connection policy received by the reception means 41.

In the related art, when a wireless communication apparatus that is in connection with a 3GPP network can establish connection to a non-3GPP network, a connection policy for connecting to a base station device in the non-3GPP network, for example, is distributed to the wireless communication apparatus. The connection policy may be, for example, one for selecting a base station device as connection destination from among a plurality of base station devices in the non-3GPP network, based on the Received Signal Strength (RSS) or position information. The connection policy may, for example, allow the selection of a base station device as connection destination, based on the RSS or position information, from not only among base station devices in the non-3GPP network but also among base station devices in the 3GPP network.

In contrast, according to an aspect of the present disclosure, owing to the above-described features, the wireless communication apparatus selects a certain base station device, based on the connection policy generated by the policy generation means 12 of the communication control device 1. In other words, when trying to establish a connection, the wireless communication apparatus gives a higher priority to a base station device not set to the restricting mode over a base station device set to the restricting mode. According to an aspect of the present disclosure, it is thus possible to concentrate wireless connections of a plurality of wireless communication apparatuses to a base station device that is not set to the restricting mode. Such an operation will be described, using a system illustrated in FIG. 6 as an example.

Figure 6:
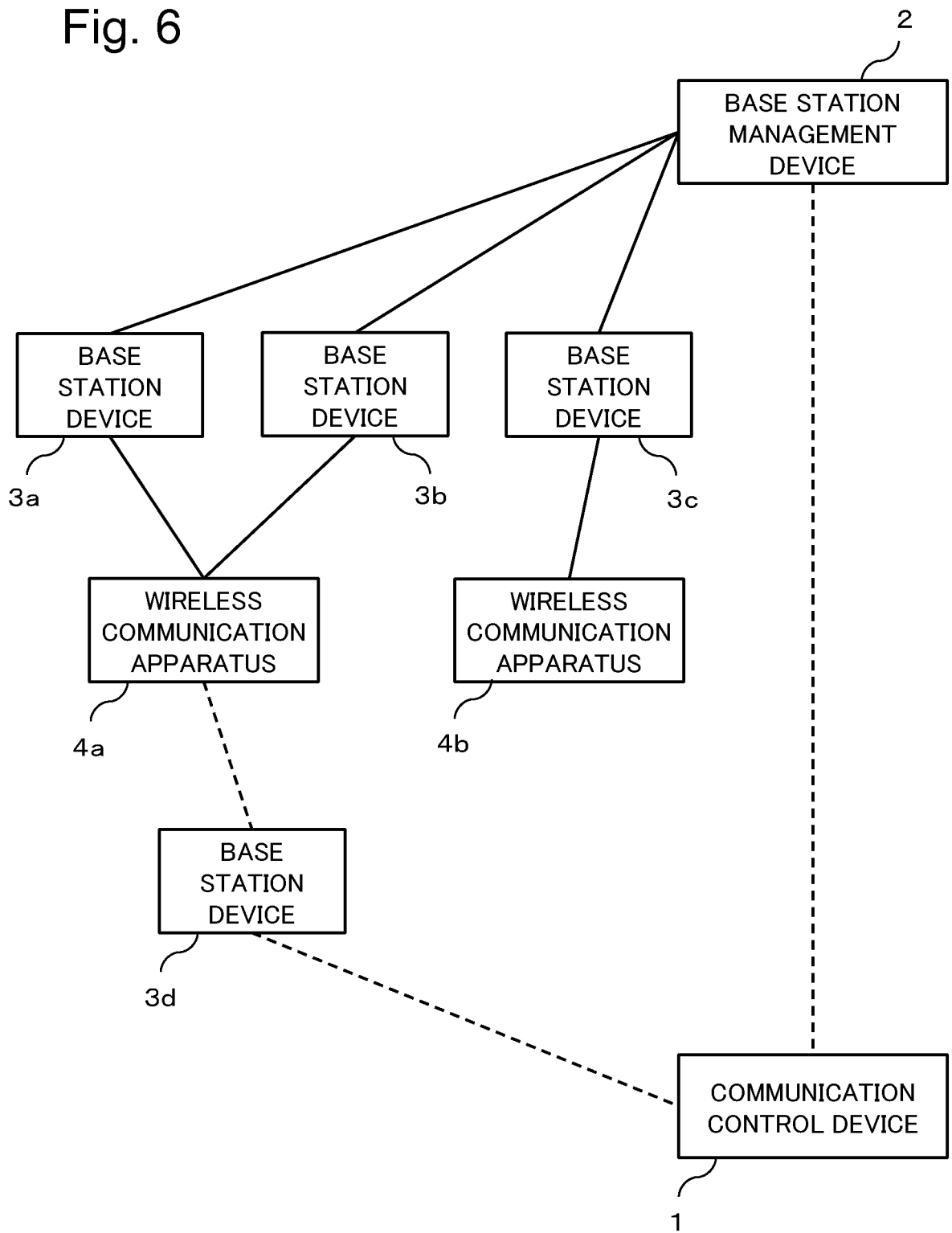
FIG. 6 is a diagram illustrating a communication control system according to an aspect of the present disclosure.

FIG. 6 is a diagram illustrating an example configuration of a system according to an aspect of the present disclosure. The system illustrated in FIG. 6 includes a communication control device 1, a base station management device 2, a base station device 3a, a base station device 3b, a base station device 3c, a base station device 3d, a wireless communication apparatus 4a, and a wireless communication apparatus 4b. The network denoted by the dotted lines in FIG. 6 will be referred to as a first RAN and the network denoted by the solid lines in FIG. 6 will be referred to as a second RAN. The first RAN may be, for example, a mobile communication network such as the UTRAN or the E-UTRAN but is not limited to these. The second RAN may be, for example, a non-3GPP network such as a Wi-Fi network but is not limited to this. The base station device 3a, the base station device 3b, and the base station device 3c may be, for example, Wi-Fi access points but are not limited to these. The base station device 3d may be, for example, NodeB or eNodeB but is not limited to these. For example, it is assumed that the base station device 3a and the base station device 3b are in a broadcast range in which they can communicate with each other, that the base station device 3b and the base station device 3c are in a broadcast range in which they can communicate with each other, and that the base station device 3a, the base station device 3b, and the wireless communication apparatus 4a are in a broadcast range in which they can communicate one another. It is assumed that the base station device 3a and the base station device 3c are not in a broadcast range in which they can communicate with each other and that the base station device 3c and the wireless communication apparatus 4a are not in a broadcast range in which they can communicate with each other.

Here, an operation will be described as to a case in which the wireless communication apparatus 4b and the base station device 3c are in communication. For example, when the wireless communication apparatus select a base station device as connection destination, based on RSS or position information in accordance with a connection policy based on the related art and, as a result, the wireless communication apparatus 4a connects to the base station device 3b and starts communication, the communications of the wireless communication apparatus 4a and the wireless communication apparatus 4b will interfere with each other, which decreases the throughput (what is called the exposed terminal problem and the deafness problem).

According to an aspect of the present disclosure, for example, the base station device 3b is switched to the restricting mode, based on the establishment of the connection of the wireless communication apparatus 4b to the base station device 3c. Next, the base station management device 2 receives, for example, from the base station device 3b, information indicating that the base station device 3b is set to the restricting mode. The base station management device 2 may receive, for example, from the base station device 3c, information indicating that the base station device 3c is not set to the restricting mode. For example, the base station management device 2 may receive, for example, from the base station device 3a, for example, information indicating that the base station device 3a is not set to the restricting mode. Each of the base station device 3a, the base station device 3b, and the base station device 3c may transmit the mode information of its setting to the base station management device 2, for example, regularly or when there is a change in the value of the mode identifier included in the mode information on the setting of the base station devices. As described above, a change occurs in the value of the mode identifier when, for example, the base station device receives information indicating that there has been a response from another base station device, located within a broadcast range that allows communication with the former base station device, to a connection request by a wireless communication apparatus, at least from one of the latter base station device and the wireless communication apparatus that made the connection request. A change occurs in the value of the mode identifier when, for example, the base station device receives information indicating that the wireless communication apparatus no longer belongs to the other base station device located within a broadcast range that allows communication with the base station device. The base station device 3a, the base station device 3b, and the base station device 3c may transmit the mode information on their respective settings to the base station management device 2 by beacon or other means.

Next, the reception means 11 of the communication control device 1 receives from the base station management device 2, for example, information that the base station device 3a and the base station device 3c are not set to the restricting mode and that the base station device 3b is set to the restricting mode. Next, based on the received information, the policy generation means 12 of the communication control device 1 generates a connection policy for controlling the connections of the wireless communication apparatus to the base station devices. The connection policy may include information for the ANDSF MO other than the mode information, for example, Access Network Discovery Information (ANDI), Inter-System Routing Policy (ISRP), and the like and information such as access technology type (3GPP network, WLAN, WiMAX, and the like), technology specific information (position information and the like), and the like.

Next, the base station device 3d receives the connection policy from the communication control device 1 and transmits the connection policy to the wireless communication apparatus 4a. The wireless communication apparatus 4a receives the connection policy from the base station device 3d and updates the ANDSF MO, which is a setting file. The wireless communication apparatus 4a gives a higher priority to the connection to the base station device 3a, which is not set to the restricting mode, than to the connection to the base station device 3b, which is set to the restricting mode, based on the connection policy. This operation prevents the communication of the wireless communication apparatus 4a and the wireless communication apparatus 4b from interfering with each other.

Therefore, with the above-described features, an aspect of the present disclosure provides a communication control device and a communication control method for generating a policy with consideration for preventing the decline of efficiency in the use of communication resources of a plurality of base station devices in one and the same access network.

Figure 7:
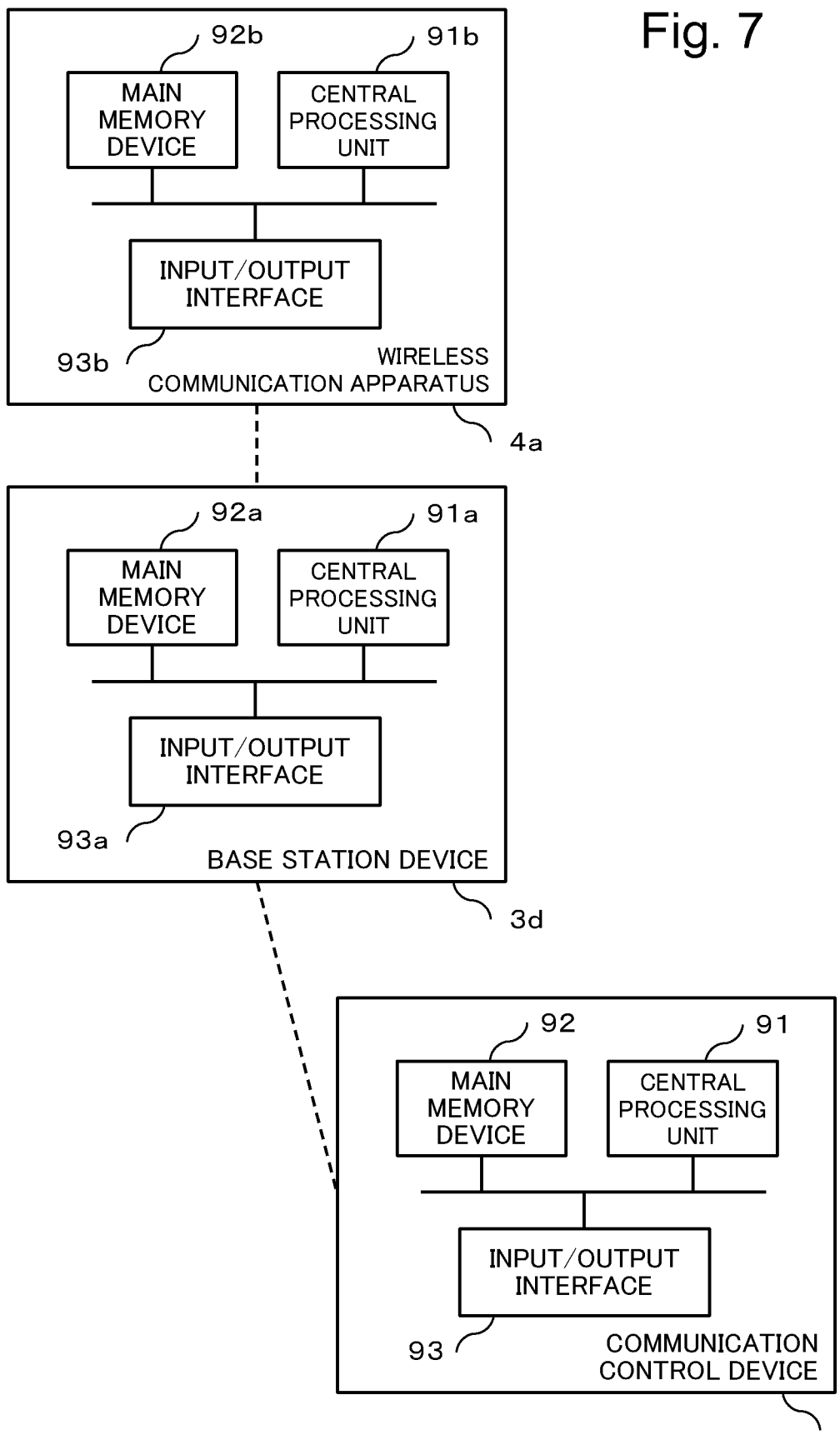
FIG. 7 is a diagram illustrating a hardware configuration of a communication control device according to an aspect of the present disclosure.

As illustrated in FIG. 7, the communication control device 1 includes hardware such as a central processing unit 91, a main memory device 92, and an input/output interface 93. The reception means 11 is achieved, for example, by the input/output interface 93. The policy generation means 12 is achieved, for example, by the central processing unit 91 and the main memory device 92. As illustrated in FIG. 7, the wireless communication apparatus 4a includes hardware such as a central processing unit 91b, a main memory device 92b, and an input/output interface 93b. The reception means 41 is achieved, for example, by the input/output interface 93b. The selection means 42 is achieved, for example, by the central processing unit 91b and the main memory device 92b.

In FIG. 7, the communication control device 1, the base station device 3d, and the wireless communication apparatus 4a may include respective auxiliary memory devices. The communication media between the communication control device 1, the base station device 3d, and the wireless communication apparatus 4a may be wired or wireless media.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 1 communication control device
11 reception means
12 policy generation means
2 base station management device
3a base station device
3b base station device
3c base station device
3d base station device
4a wireless communication apparatus
41 reception means
42 selection means
4b wireless communication apparatus
91 central processing unit
92 main memory device
93 input/output interface
91a central processing unit
92a main memory device
93a input/output interface
91b central processing unit
92b main memory device
93b input/output interface

The invention claimed is:

1. A communication control device including an Access Network Discovery and Selection Function (ANDSF) for generating a connection policy for controlling connection of a wireless communication apparatus to a base station device, the communication control device comprising:
   a reception unit receiving mode information, which is information on a restricting mode, which is a setting of a first base station device; and
   a policy generation unit generating the connection policy based on the mode information,
   wherein the restricting mode is a setting for performing an operation of decreasing a degree of priority given to a connection of the wireless communication apparatus to the first base station device when a second base station device located within a broadcast range that allows communication with the first base station device communicates with another wireless communication apparatus.

2. The communication control device according to claim 1, wherein
   the connection policy includes the mode information, the mode information includes a mode identifier, which is information indicating an identifier of the first base station device and a designation of the restricting mode.

3. The communication control device according to claim 2, wherein the mode identifier is expressed in a discrete value.

4. The communication control device according to claim 3, wherein
   the mode identifier is expressed in a binary value.

5. The communication control device according to claim 2, wherein
   the mode identifier is expressed in a continuous value.

6. The communication control device according to claim 1, wherein
   the connection policy includes an identifier of such a base station device that a connection by a wireless communication apparatus to the base station device is restricted.

7. A communication control method comprising:
   receiving mode information, which is information on a restricting mode, which is a setting of a first base station device; and
   generating, based on the mode information, a connection policy for controlling connection of a wireless communication apparatus to a base station device,
   wherein the restricting mode is a setting for performing an operation of decreasing a degree of priority given to a connection of the wireless communication apparatus to the first base station device when a second base station device located within a broadcast range that allows communication with the first base station device is communicating with another wireless communication apparatus.

8. A wireless communication apparatus comprising:
   a reception unit receiving a connection policy for controlling connection of a wireless communication apparatus to a base station device, the connection policy generated based on mode information, which is information on a restricting mode, which is a setting of a first base station device; and
   a selection unit selecting, based on the connection policy, the first base station device as connection destination,
   wherein the restricting mode is a setting for performing an operation of decreasing a degree of priority given to a connection of the wireless communication apparatus to the first base station device when a second base station device located within a broadcast range that allows communication with the first base station device is communicating with another wireless communication apparatus.

* * * * *